[72] Inventor John Malcolm Dunn
305 Via Montego, San Clemente, Calif. 92672
[21] Appl. No. 802,782
[22] Filed Feb. 27, 1969
[45] Patented Nov. 30, 1971

[54] DISPLAY HOLDER FOR DISCS
4 Claims, 9 Drawing Figs.
[52] U.S. Cl........................................... 206/0.83,
206/80 R, 220/31 S
[51] Int. Cl............................................ A45c 11/28
[50] Field of Search............................. 206/0.84,
0.83, 0.82, 0.8, 70, 79, 80, 81; 220/31 S, 31 R; 63/18

[56] References Cited
UNITED STATES PATENTS
| 316,118 | 4/1885 | Cooke | 63/18 |
| 3,047,143 | 7/1962 | Voigt | 206/80 |
| 2,860,774 | 11/1958 | Ball | 229/92.9 X |
| 2,457,998 | 1/1949 | Hayes et al. | 206/0.83 |
| 3,229,809 | 1/1966 | Spadaro | 206/0.82 |
| 3,448,850 | 6/1969 | Segel et al. | 206/0.8 |
| 435,844 | 9/1890 | Logan | 206/70 |
| 3,381,916 | 5/1968 | Edgell | 220/31 SR X |

FOREIGN PATENTS
| 231,281 | 4/1925 | Great Britain | 206/80 |
| 457,267 | 5/1950 | Italy | 206/0.8 |

*Primary Examiner*—Joseph R. Leclair
*Assistant Examiner*—John M. Caskie
*Attorney*—William Jacquet Gribble ABSTRACT: Transparent, flanged, mating cups encapsulate a coin, medallion or other disc. A cup holder having one or more recesses receives the cups and disc. Each recess is countersunk in obverse and reverse faces to receive the cup flanges. Each cup has locator protuberances. The outer cup locators fit cavities in the holder recess wall. The inner cup locators grip the disc. The cups have mechanically latching annuli which engage to hold the cups together and retain the cups in the holder.

PATENTED NOV 30 1971 3,624,832
SHEET 1 OF 2
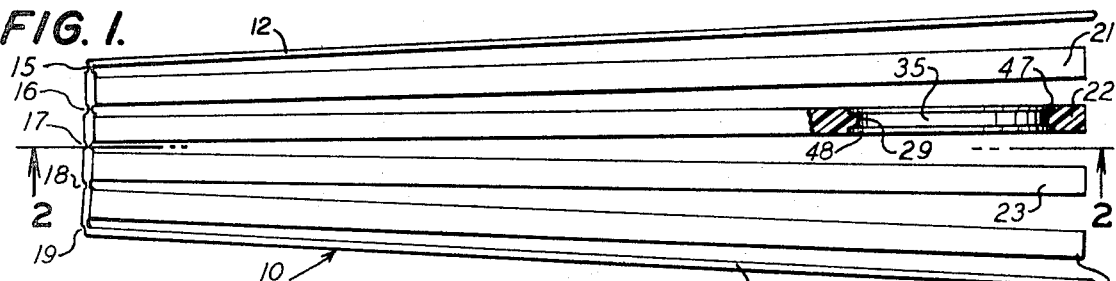
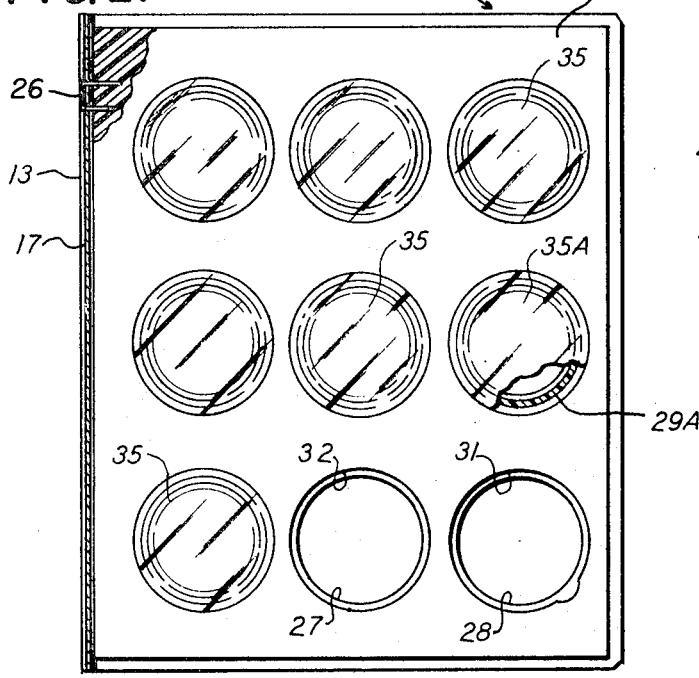
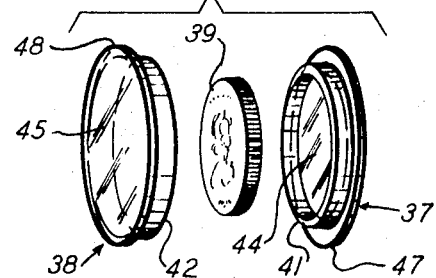
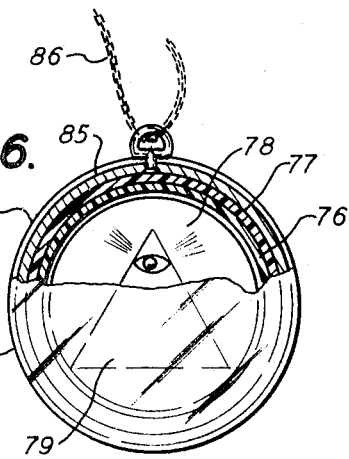
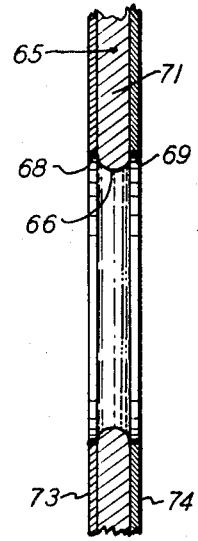
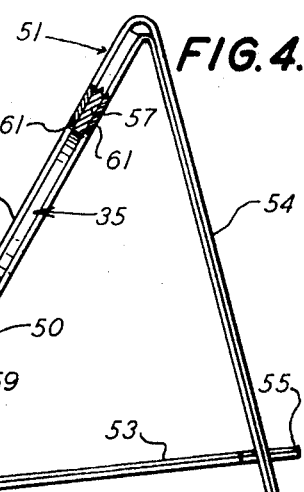
INVENTOR:
JOHN MALCOLM DUNN
BY
W. J. Gribble
ATTORNEY

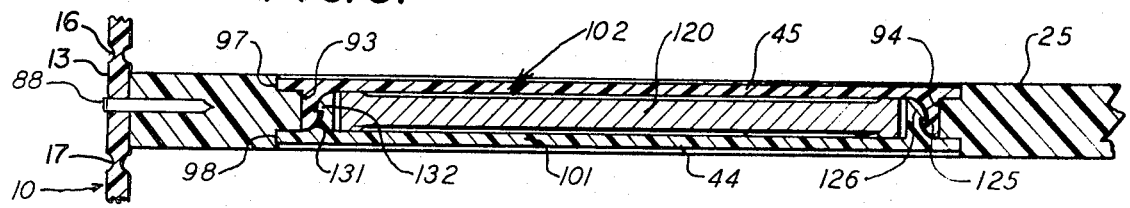
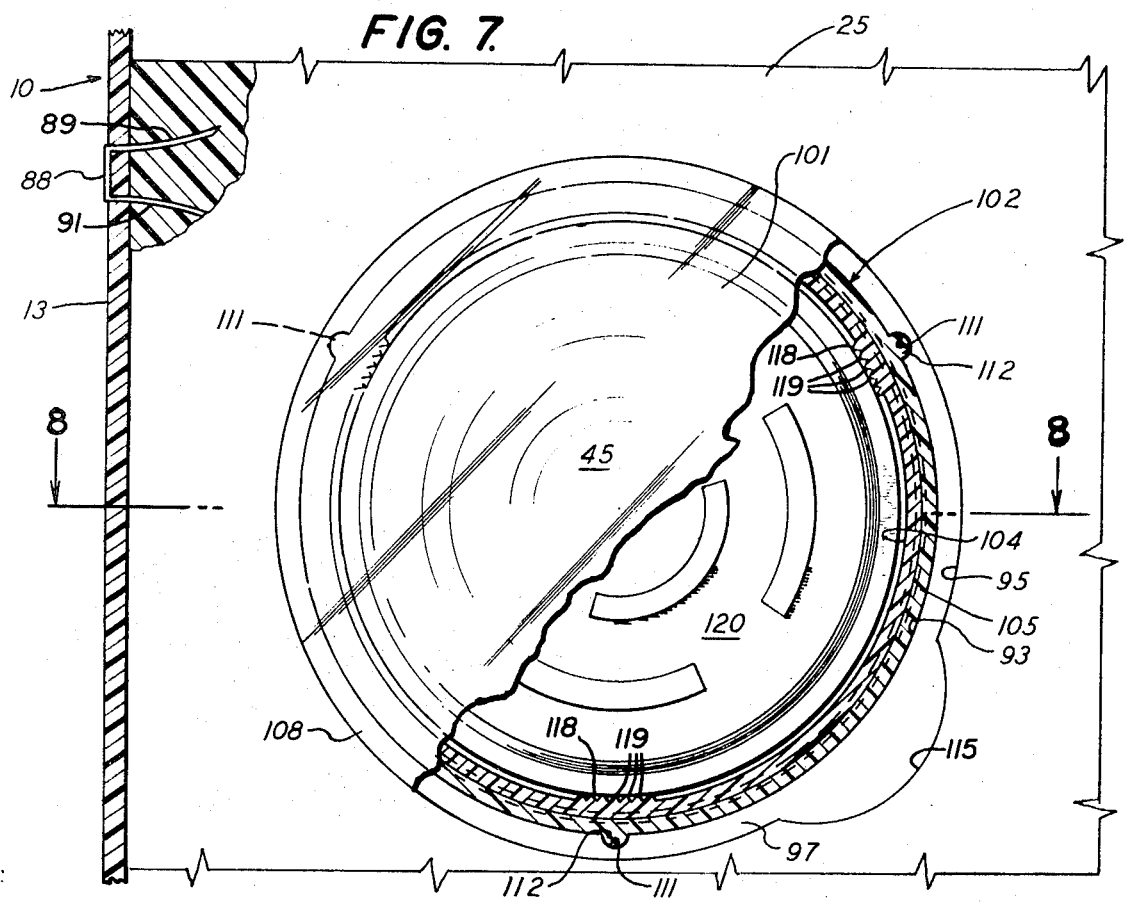
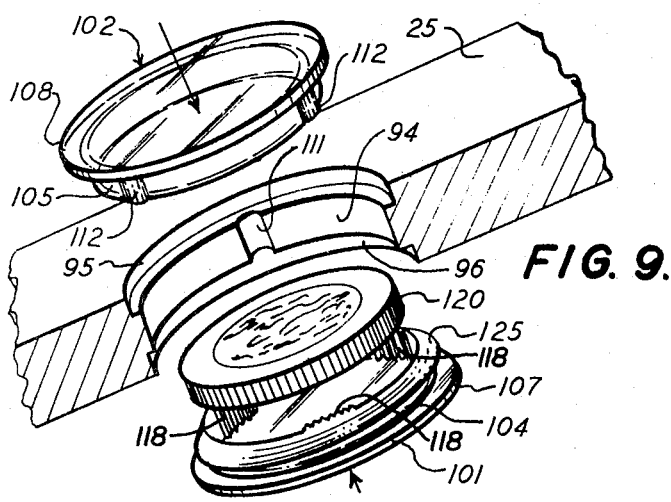

DISPLAY HOLDER FOR DISCS

Coins, medals, tokens and other collector items are in part judged as to worth by surface condition. Many attempts have been made to produce apparatus which protects such items and still permits their observation. Most such attempts have failed because of economic impracticability or lack of display facility. I have invented disc holders that display the items impressively, simply and inexpensively by utilizing existing materials in a unique way.

BRIEF SUMMARY OF THE INVENTION

The invention contemplates a display holder for discs that comprises first and second flanged cups adapted to encapsulate a disc such that the flanges of the cups are parallel and spaced apart, with holder means adapted to fit between the flanges to support the cups enclosing the discs. A transparent wall on each cup is adjacent the obverse or reverse face of the disc.

Preferably the holder comprises a folio having an outer cover and a plurality of pages fixed to the back of the folio by fasteners penetrating the edge of each page. Each page has one or more annular walls defining a recess adapted to receive mated cups surrounding a disc. Each recess has obverse and reverse annular indentations into which the cup flanges fit. The indentations are preferably deeper than the flange thickness so that the cup face resides slightly below the page surface, guarding the transparent wall of the cup from scratches and other mechanical damage.

Other holder types may be used such as easels, rings or loops on chains, or framed panels. Each has its advantages for particular display or storage situations.

BRIEF DESCRIPTION OF THE DRAWING

FIG. 1 is a plan view of a folio for holding and displaying discs in accordance with the invention;

FIG. 2 is a sectional elevation taken along line 2-2 of FIG. 1 on a reduced scale;

FIG. 3 is an exploded view of mating cups and a coin in accordance with the invention;

FIG. 4 is an alternate embodiment of the invention shown in elevation and partly in section;

FIG. 5 is a fragmentary sectional view of a holder adapted to combine with the mating cups of the invention;

FIG. 6 is a further alternate embodiment of the invention shown in elevation and partly in section;

FIG. 7 is a fragmentary sectional elevational view of the preferred embodiment of the invention;

FIG. 8 is a partial plan section taken along line 8-8 of FIG. 7; and

FIG. 9 is a fragmentary exploded view demonstrating the assembly of a disc with the apparatus of the invention.

In the Figures like parts are given like reference numerals. While the illustrative embodiments disclose apparatus for use with round discs, it is to be understood that the invention may be accommodated to parts of any shape by slight modifications in configuration only.

In the embodiment of FIGS. 1, 2, and 3 a folio 10 has front and rear covers 11 and 12 respectively, joined by a back 13. The folio is preferably of a strong, semiflexible plastic such as a polyalomer that is capable of processing to form so-called "living hinge" lines. The folio back has such hinge lines at 15, 16, 17, 18 and 19. Rigid holder pages 21, 22, 23 and 24 are fixed to the folio back between adjacent hinge lines. For instance, page 22 is fixed to the back between hinge lines 16 and 17. The hinge lines enable the folio to be opened to display the desired page despite the rigidity of the individual pages.

The holder pages may be fixed to the folio back in any convenient fashion. However, the presently preferred method, when the pages are made from a relatively dense foam plastic, is for metallic staples 26 to be driven through the folio back into the edge of the page.

Each holder page has a plurality of annular walls, such as the walls 27, 28 of FIG. 2, defining cup recesses 29. Each face of the page has indentations defined by shallow annular walls such as the walls 31, 32 concentric with each recess. Each of the other recesses in page 22 contains a pair of mating cups 35, such as the pair 35A in recess 29A.

FIG. 3 illustrates a cup pair in which an inner cup 37 and an outer cup 38 surround a coin 39. Each cup has an annular wall. Annular wall 41 of the inner cup is adapted to fit within annular wall 42 of the outer cup. The coin then resides within wall 41 of the inner cup.

A transparent wall 44 seals an end of the annular wall 41. A similar transparent wall 45 seals an end of annular wall 42. Each wall 44, 45 extends outwardly beyond the respective annular wall in a flange 47, 48 respectively. As can be seen in FIG. 1, flanges 47, 48 of cup 35 fit within the shallow indentations of the recess 29 in page 22.

In FIG. 4 a cup pair 35 resides in a cup recess 50 in a holder 51. The holder is in the form of an easel with a display front 52, a base 53 and a back 54. In conventional fashion the base has a tab 55 that fits a slot (not shown) in the back to secure the easel in triangular shape.

The easel holder is a laminate, having a core 57 fixed to outer sheets 58, 59. The core terminates with the extent of the easel front, but the outer sheets continue to define the easel back and base.

Cup recess 50 is defined by a circular wall in the core. The shallow indentations 61 for the cup flanges are incised in the outer sheets concentrically with the cup recess. The outer sheets are preferably incised prior to assembly with the core, although the recesses may all be made when the laminate is completed.

FIG. 5 illustrates fragmentarily a laminar sheet 65 having a recess 66 to receive a cup pair. The recess has shallow indentations 68, 69 in each face of sheet 65, concentric about the recess. As in the embodiment of FIG. 4, a core 71 surrounds the cup body and the outer laminations 73, 74 surround the cup flanges. Sheet 65 may have several recesses, depending upon its use.

FIG. 6 illustrates a further alternate embodiment wherein an inner cup 76 and a mating outer cup 77 encapsulate a medallion 78. Each cup has a transparent wall 79 extending outwardly beyond the cup peripheries in flanges 81, 82. An encircling ring 85 supports the cups from a chain 86. The ring is gripped between the cup flanges.

PREFERRED EMBODIMENT OF THE INVENTION

In FIGS. 7, 8 and 9, a folio 10 has a page 25 fixed to its back 13 between hinge lines 16 and 17. The page is rigid, so that the flexibility of the folio back affords access to it and adjacent pages (not shown). Metallic staples 88 secure the page to the back. The staples may be of a type predisposed to spread when inserted, so that the legs 89, 91 of the staple diverge within the page, fixing the page and back securely.

Only that portion of the folio and page immediately adjacent an annular cup recess 93 is shown. Other recesses for disc cups may occupy the same page. Recess 93 is defined by a wall 94. Similar walls 95, 96 of larger diameter define shallow indentations 97, 98 about the cup recess in each face of the page. A mated cup pair 35 resides in the recess. The pair comprises an inner cup 101 and an outer cup 102. Each cup 101, 102 has a transparent end wall 44, 45, respectively. The end walls extend beyond the annular walls 104, 105 of cups 101, 102, respectively, in flanges 107, 108. The flanges reside in the shallow indentations of the recess such that the transparent walls lie below the page surface to avoid damage.

Wall 94 of the recess has a plurality of circumferentially spaced cavities 111. Outer cup 102 has a plurality of outer locators 112 spaced about the periphery of its annular wall 105. The locators fit into the cavities to orient the cup with respect to the run of the page.

A thumb depression 115 may lie in the page abutting the indentation, leading to the edge of the flange, to afford easier removal of the cup from the page.

Inner cup 101 has a plurality of coin locators 118 extending inwardly from its annular wall 104. While the locator may comprise a protuberance of a variety of shapes, it is preferred that each locator 118 comprise a plurality of sharp ridge 119 running across the annular wall and projecting therefrom.

The locators 118 seat the coin firmly in the inner cup, as shown by coin 120 in FIG. 7. The locators 112 of the outer cup fix the position in the page. Therefore, it is only necessary to assemble the cup pairs properly to achieve positive and permanent proper orientation of the displayed coin or other disc in the page.

The cup halves are held together by the mechanical lock of the peripheral beads 125, 126 on the outer and inner walls, respectively, of the inner and outer cups 101, 102. Each bead has a lip 131 curving to the edge of the annular cup wall from an engaging notch 132. The cups are preferably fabricated from a plastic having the characteristics of clarity, resiliency and scratch resistance. The resilient quality enables the engaging beads of the two cups to spring past each other on assembly, such that the notches overlap to lock the cups in place with respect to each other and, by means of the cup flanges, with respect to the holder. The cups may be made of butyrate, which has the characteristics of optical clarity, vapor impenetrability and inertness to oxidation and discoloration. Other substances with like attributes and resiliency can also be used. The folio cover is preferably made from a plastic material like "Duratuff," a polymer.

The method of assembling cups, disc and holder page is shown in FIG. 9. A segment of the page is shown with the inner cup and the disc beneath the page and the outer cup above the page. The disc is first placed in the inner cup. Then the two cup portions are brought together within the recess in the page. The beads 125, 126 yield to allow overlap until the notches engage. The disc is then held within a sealed cup, oriented with respect to the holder and visible to an observer from either side.

Orientation is assured by the disc being fixed in the inner cup while the outer cup is registered securely in the page by the engagement between the cup locators 112 and the recess cavities 111.

The recesses illustrative of the invention have been disclosed as annular and cylindrical. Other configurations for recesses are as fitting to the invention. The recesses can be conical from each face of the holder, or toroidal, or combinations of all three annular shapes, as long as two joined cups are held within the recess of the holder.

I claim:

1. A display holder for discs comprising a first flanged cup into which the disc fits, a second flanged cup adapted to fit about the first cup such that the flanges of the fitted cups are parallel and spaced apart, holder means adapted to fit between the flanges to support the cups enclosing the disc, a transparent wall on each cup adjacent each face of the disc contained, said first flanged cup having an annular bead, an annular bead on the second cup, and a lapping portion of each bead interlocking with a like portion on the other cup to latch the cups together.

2. Apparatus in accordance with claim 1 wherein interior locator means on the first cup extend to contact the disc to locate the disc with respect to the cup center.

3. Apparatus in accordance with claim 2 wherein an outer locator protrudes from the outer periphery of each second cup, and an indentation on each holder means adapted to receive the outer locator so as to fix the orientation of the cups with respect to the holder means.

4. A display holder for discs comprising a first flanged cup into which the disc fits, a second flanged cup adapted to fit about the first cup such that the flanges of the fitted cups are parallel and spaced apart, holder means adapted to fit between the flanges to support the cups enclosing the disc, a transparent wall on each cup adjacent a face of the disc contained, an outer locator protruding from the outer periphery of the second cup, and an indentation on each holder means adapted to receive the outer locator so as to fix the orientation of the cups with respect to the holder means.

* * * * *